(12) United States Patent
Stallings, Jr. et al.

(10) Patent No.: US 7,967,274 B1
(45) Date of Patent: Jun. 28, 2011

(54) VEHICLE WINDOW-MOUNTED UMBRELLA HOLDER

(76) Inventors: Robert Lee Stallings, Jr., Durham, NC (US); Robert Lee Stallings, Graham, NC (US)

( * ) Notice: Subject to any disclaimer, the term of this patent is extended or adjusted under 35 U.S.C. 154(b) by 0 days.

(21) Appl. No.: 12/868,526

(22) Filed: Aug. 25, 2010

(51) Int. Cl.
*A01K 97/10* (2006.01)
(52) U.S. Cl. ...... 248/534; 248/537; 248/538; 248/206.3
(58) Field of Classification Search .......... 248/534, 248/525, 537, 538, 539, 205.5, 206.3, 206.5, 248/205.3, 205.2, 518, 536, 515, 314
See application file for complete search history.

(56) References Cited

U.S. PATENT DOCUMENTS

| | | | | |
|---|---|---|---|---|
| 1,523,042 | A * | 1/1925 | Thomas | 248/537 |
| 2,914,278 | A * | 11/1959 | Burke | 248/538 |
| 4,696,447 | A * | 9/1987 | Strecker | 248/206.3 |
| 5,150,728 | A | 9/1992 | Stark | |
| 5,385,161 | A * | 1/1995 | Loker et al. | 135/15.1 |
| 5,396,915 | A * | 3/1995 | Bomar | 135/16 |
| D374,393 | S * | 10/1996 | Beasley | D8/373 |
| 6,213,440 | B1 * | 4/2001 | Kornback | 248/514 |
| D448,717 | S * | 10/2001 | Hanson et al. | D12/223 |
| 6,959,715 | B2 | 11/2005 | Siegel | |

* cited by examiner

*Primary Examiner* — Anita M King

(57) ABSTRACT

A unitary piece umbrella holder, adapted to be mounted on a vehicle window, including a plate, a receptacle mounted on an angle relative to the plate; and at least one fastener mounted on the plate.

8 Claims, 2 Drawing Sheets

VEHICLE WINDOW-MOUNTED UMBRELLA HOLDER

BACKGROUND OF THE INVENTION

The present invention generally relates to a vehicle window-mounted umbrella holder. More specifically, the present invention relates to an umbrella holder adapted to be removable from a vehicle window.

When a person is carrying an umbrella in one hand and an article or child in the other hand, getting into the interior of a vehicle is difficult because both hands are in use. The person may either set the article or child down or set the umbrella down before having access to the vehicle. By doing this, either the article or the user may get wet.

As can be seen, there is a need for a holder for supporting an umbrella over an open vehicle door, by attaching the holder to the vehicle window, to cover the space between the open vehicle door and the vehicle itself, to protect the user, and simultaneously to permit the user to load or unload the vehicle without exposing the user to the inclement weather, either himself or the articles or child to be loaded or unloaded.

SUMMARY OF THE INVENTION

In one aspect of the present invention, the umbrella holder includes a unitary piece having a plate and a receptacle mounted on an angle relative to the plate.

In another aspect of the present invention, the umbrella holder includes an injection molded piece having a plate, a receptacle mounted on an angle relative to the plate, and at least one suction cup mounted on the opposite side of the plate.

In another aspect of the present invention, the umbrella holder includes an injection molded piece having a plate, a receptacle mounted on an angle relative to the plate, at least one notch located on the perimeter of the plate, and a fastener connected to each one of the notches.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an umbrella holder adapted to be mounted on a vehicle window.

Figure 1:
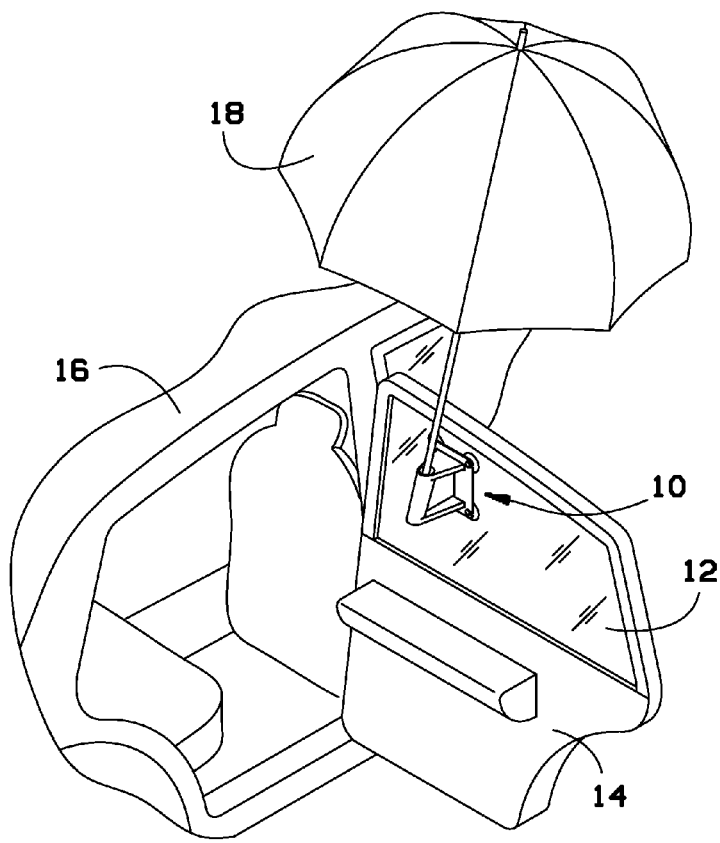
FIG. 1 illustrates a perspective view of the vehicle window-mounted umbrella holder according to the present invention.

FIG. 1 shows the umbrella holder 10 mounted on window 12 of a vehicle 16.

Figure 2:
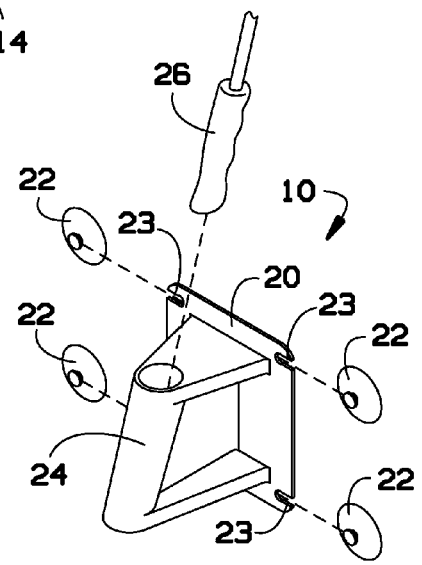
FIG. 2 illustrates an exploded perspective view of the umbrella holder of FIG. 1.

FIG. 2 shows an exploded view of the umbrella holder 10 of the present invention. The holder 10 may include a plate 20, a receptacle 24 to hold the umbrella handle 26, and fasteners 22 to mount the umbrella holder 10 onto the window 12.

The umbrella holder 10 may be made as a unitary piece. In one embodiment, the umbrella holder 10 may be made as one piece injection molded device. In one embodiment, the umbrella holder 10 may be made of a high-impact plastic. In one embodiment, the plate 20 may have a flat surface. The plate 20 may be placed flat against the vehicle window 12. The plate 20 may have a polygonal shape. In one embodiment, the plate 20 may have a rectangular, square, triangular, round, rhombus, or parallelogram shape. The size of the plate 20 may be determined by the size of the umbrella to be held. For example, for large umbrellas, the plate may have a bigger surface area than the surface area for a plate for a small umbrella. In one embodiment, the plate 20 may have a rectangular shape measuring approximately 5 inches in width by 7 inches in height.

A plurality of notches 23 may be integrally molded on the perimeter of the plate 20.

Figure 3:
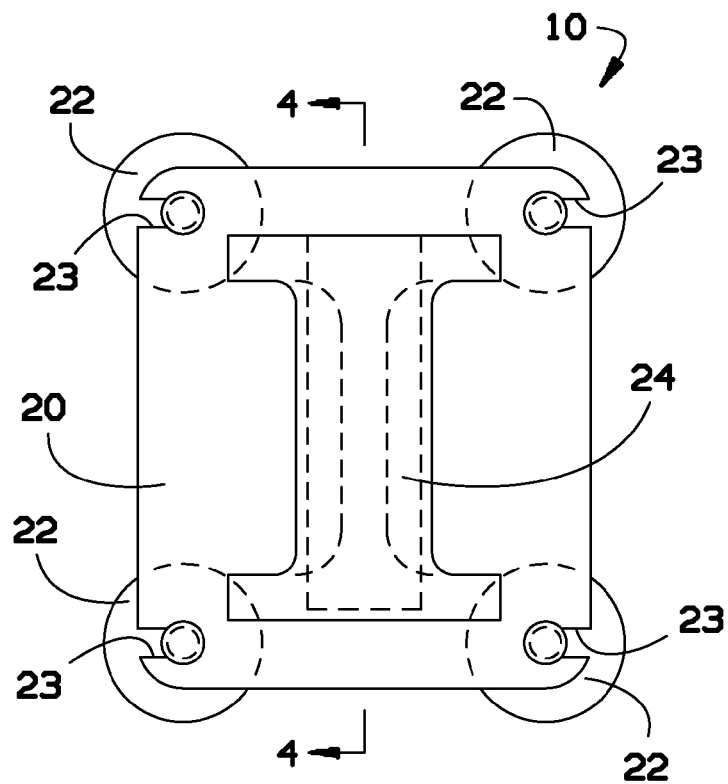
FIG. 3 illustrates a front view of the umbrella holder of FIG. 1.

FIG. 3 shows one embodiment of the umbrella holder 10 according to the present invention on which one notch 23 may be placed on each corner of the plate 20.

The umbrella holder 10 may be mounted to the interior of a vehicle window 12 by using fasteners 22. The fasteners 22 may be positioned on each notch 23 of the plate 20. The fasteners 22 may be placed on the side of the plate 20 that contacts the window 12. The fasteners 22 may be a device that allows the umbrella holder 10 to easily move from one window 12 to another window of the vehicle 16. In one embodiment, the fasteners 22 may be suction cups or rubber disks. In one embodiment, the fasteners 22 may be suction cups. In one embodiment, a suction cup may be attached at each of corner of the plate 20.

In one embodiment, the present invention may contemplate the use of adhesives, tape, or a hook and loop system to attach the umbrella holder 10 to the vehicle window 12. In one embodiment, the fastener 22 may be adhesive tape placed on the surface of the plate 20 contacting the window. In one embodiment, the fastener 22 may be magnets and the umbrella holder 10 may be placed on the metal frame of the door 14 of the vehicle.

The receptacle 24 may be integrated molded into the plate 20. The receptacle 24 may be placed on the side of the plate 20 opposite to the fastener 22. An imaginary line extending along an axis of the tubular member (shown, for example, by a dotted line in FIG. 2) may extend out of the open top end of the receptacle 24 to intersect with a plane defined by the plate 20.

Figure 4:
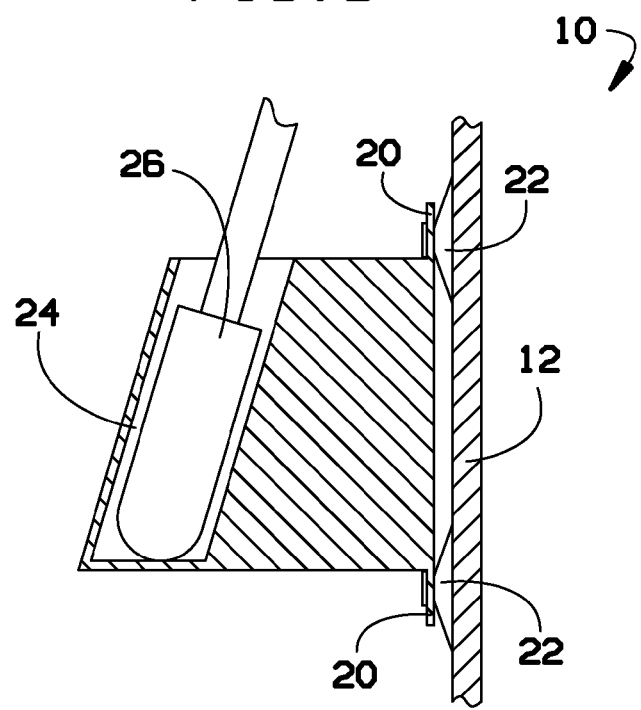
FIG. 4 illustrates a cross section view taken along line 4-4 of FIG. 3.

FIG. 4 shows cross section view taken along line 4-4 of FIG. 3 on which the receptacle 20 may be placed on an angle relative to the plate 20 to allow the vertical orientation of the open umbrella. The angle may depend on the size of the umbrella. The receptacle 24 may be a hollow receptacle. In one embodiment, the bottom of the receptacle 24 may be closed. In one embodiment, the walls of the receptacle may be tapered towards the bottom.

In vehicles having sliding doors, the umbrella holder 10 may be attached to the exterior of the vehicle window 12. In this embodiment, the manufacturer may have to invert the angle of the receptacle 24 with respect to the window to allow the vertical orientation of the open umbrella.

The umbrella holder 10 may be quickly and easily mounted to the vehicle window 12 by attaching the fasteners 22 to the window 12. Then, the user simply needs to insert the handle 26 of the open umbrella 18 into the tubular receptacle 24. This will allow the hands-free loading or unloading of articles and/or children into the vehicle while being protected from the inclement weather.

When the loading or unloading is complete, the user may simply lift the umbrella out of the receptacle. The umbrella holder 10 may remain mounted to the vehicle window 12 or may be removed and stored inside the vehicle 16.

It should be understood, of course, that the foregoing relates to exemplary embodiments of the invention and that modifications may be made without departing from the spirit and scope of the invention as set forth in the following claims.

We claim:

1. An umbrella holder comprising:
    a plate including a periphery, a first side, and a second side;
    a receptacle mounted on the first side of the plate; and
    one or more notches located on the perimeter of the plate, wherein
    the receptacle is a tubular member having an open top end, wherein an imaginary line extending along an axis of the tubular member extends out of the open top end to intersect with a plane defined by the plate, and wherein the umbrella holder is a one-piece injection molded holder.

2. The umbrella holder of claim 1, including one or more fasteners.

3. The umbrella holder of claim 2, wherein each of the one or more fasteners is connected to a respective one of the one or more notches.

4. The umbrella holder of claim 2, wherein the fasteners are suction cups.

5. An umbrella holder adapted to be mounted on a vehicle window, the umbrella holder comprising:
    an injection molded piece having:
        a plate including a periphery, a first side, and a second side;
        a receptacle mounted on the first side of the plate, wherein the receptacle is mounted on an angle relative to the plate; and
        at least one suction cup mounted on the second side of the plate, wherein
    the receptacle is a tubular member having an open top end, wherein an imaginary line formed from an axis of the tubular member extends out of the open top end to intersect a plane defined by the plate.

6. The umbrella holder of claim 5, wherein the umbrella holder is removable from the window.

7. An umbrella holder adapted to be mounted on a vehicle window, the umbrella holder comprising:
    an injection molded piece having:
        a plate including a periphery, a first side, and a second side;
        a tubular receptacle mounted on the first side of the plate, wherein the receptacle is mounted on an angle relative to the plate such that an imaginary line extending along an axis of the tubular receptacle extends out from a top open end of the tubular receptacle to intersect a plane defined by the plate;
        one or more notches located on the perimeter of the plate; and
        one or more fasteners respectively connected to the one or more notches.

8. The umbrella holder of claim 7, wherein the plate includes corners and wherein the one or more notches includes four notches respectively located at each corner on the plate.

* * * * *